(12) United States Patent
Hwang

(10) Patent No.: US 9,147,429 B1
(45) Date of Patent: Sep. 29, 2015

(54) SYSTEMS AND METHODS FOR SKEW TOLERANT MULTI-HEAD DATA PROCESSING

(71) Applicant: LSI Corporation, San Jose, CA (US)

(72) Inventor: Eui Seok Hwang, Palo Alto, CA (US)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 52 days.

(21) Appl. No.: 14/230,120

(22) Filed: Mar. 31, 2014

Related U.S. Application Data

(60) Provisional application No. 61/971,672, filed on Mar. 28, 2014.

(51) Int. Cl.
| | | |
|---|---|---|
| G11B 20/10 | (2006.01) | |
| G11B 5/48 | (2006.01) | |
| G11B 5/596 | (2006.01) | |
| G11B 5/012 | (2006.01) | |

(52) U.S. Cl.
CPC ........ *G11B 20/10046* (2013.01); *G11B 5/4813* (2013.01); *G11B 5/59627* (2013.01); *G11B 5/012* (2013.01); *G11B 20/10212* (2013.01)

(58) Field of Classification Search
CPC ....... G06F 17/10; G06F 3/064; G06F 3/0676; G06F 3/0619; H03M 13/112; G11B 5/012; G11B 5/5927; G11B 20/10388; G11B 2220/2516; G11B 20/10037; G11B 20/10212; G11B 20/10046; G11B 5/56; G11B 5/59627; G11B 5/4813

USPC .................................. 360/45, 39, 25, 53, 75
See application file for complete search history.

(56) References Cited

U.S. PATENT DOCUMENTS

| | | | | |
|---|---|---|---|---|
| 8,810,940 | B2 * | 8/2014 | Jin et al. | 360/39 |
| 8,902,536 | B1 * | 12/2014 | Hwang et al. | 360/75 |
| 9,026,572 | B2 * | 5/2015 | Chang et al. | 708/323 |
| 9,043,684 | B2 * | 5/2015 | Yang et al. | 714/779 |
| 2015/0012800 | A1 * | 1/2015 | Yang et al. | 714/769 |
| 2015/0160869 | A1 * | 6/2015 | Xiao et al. | 360/39 |

OTHER PUBLICATIONS

U.S. Appl. No. 14/148,306, filed Jan. 6, 2014, Pan et al.
U.S. Appl. No. 14/230,240, filed Mar. 31, 2014, Wilson et al.
U.S. Appl. No. 14/025,409, filed Sep. 12, 2013, Shaohua Yang, Unpublished.
U.S. Appl. No. 14/483,306, filed Jan. 6, 2014, Lu Pan, Unpublished.
U.S. Appl. No. 14/217,833, filed Mar. 18, 2014, Jeffrey P. Grundvig, Unpublished.
U.S. Appl. No. 14/217,805, filed Mar. 18, 2014, Jeffrey P. Grundvig, Unpublished.
U.S. Appl. No. 14/217,783, filed Mar. 18, 2014, Jeffrey P. Grundvig, Unpublished.

* cited by examiner

*Primary Examiner* — Ali Neyzari
(74) *Attorney, Agent, or Firm* — Hamilton DeSanctis & Cha

(57) ABSTRACT

Systems, methods, devices, circuits for data processing, and more particularly to systems and methods for processing skew tolerant processing of data derived from multiple read heads.

20 Claims, 8 Drawing Sheets

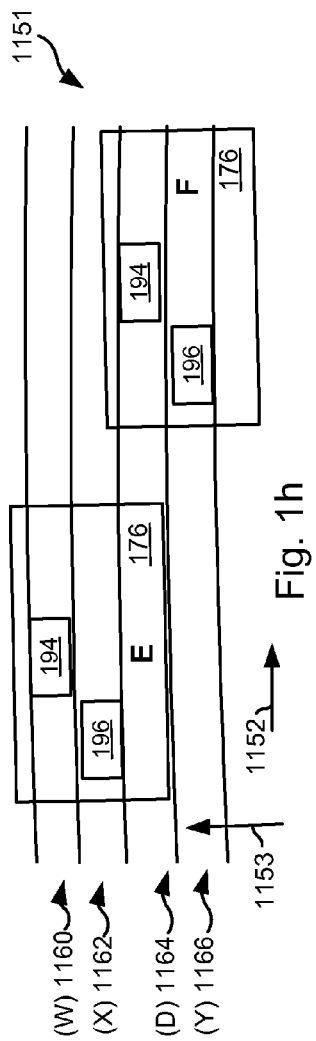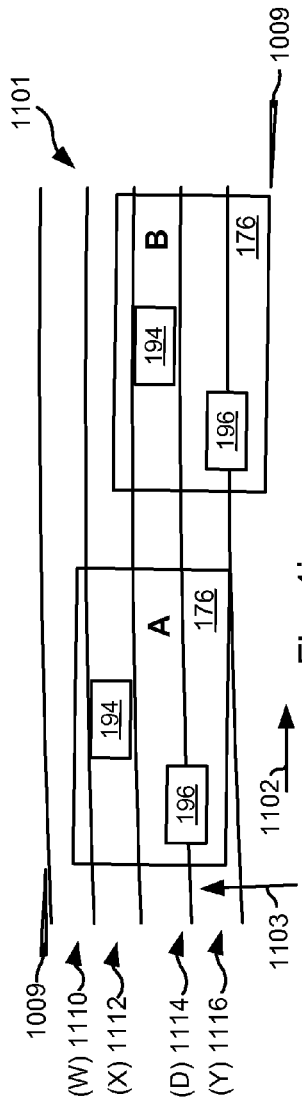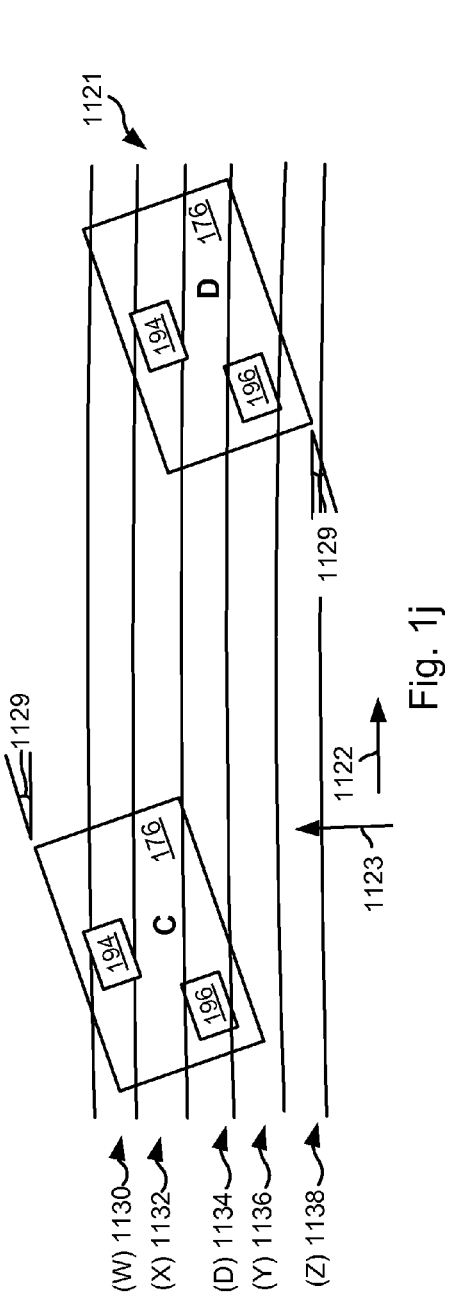

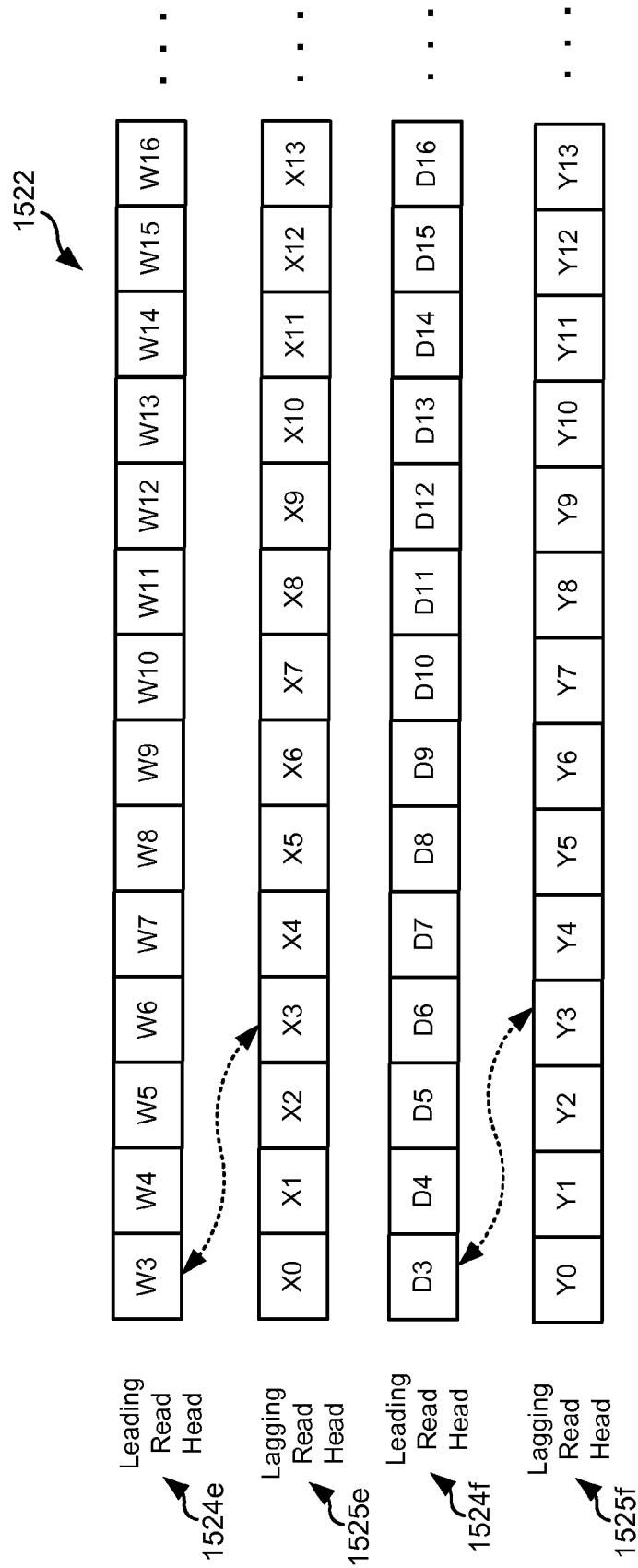

SYSTEMS AND METHODS FOR SKEW TOLERANT MULTI-HEAD DATA PROCESSING

CROSS REFERENCE TO RELATED APPLICATIONS

The present application claims priority to (is a non-provisional of) U.S. Pat. App. No. 61/971,672 entitled "Systems and Methods for Skew Tolerant Multi-Head Data Processing", and filed Mar. 28, 2014 by Hwang. The entirety of the aforementioned provisional patent application is incorporated herein by reference for all purposes.

FIELD OF THE INVENTION

Systems, methods, devices, circuits for data processing, and more particularly to systems and methods for processing skew tolerant processing of data derived from multiple read heads.

BACKGROUND

The use of multiple read heads disposed in a read/write head assembly has been developed to sense and process data from a user data region of a storage medium. In the case of two read heads, the two read heads may be located, for example, approximately 100 nm apart in a down track direction. In some cases, the stroke of the storage medium (i.e., a radial location of the read/write head assembly relative to the storage medium) results in the two read heads extending across multiple tracks on the storage medium. This typically occurs near the outer diameter and inner diameter of the storage medium where a skew angle due to the stroke is most pronounced. Some approaches have been developed to alleviate this situation including the use of three or more read heads on the same read/write head assembly and disposed in relation to one another such that there is a guarantee that two of the three or more read heads are sensing data from the same track regardless of the stroke. Such an approach requires relatively tight tolerances of the location of one read head relative to other read heads on the read/write head assembly, and as such increases the production costs of read/write head assemblies.

Hence, for at least the aforementioned reasons, there exists a need in the art for advanced systems and methods for processing data derived from multiple read heads sensing data from tracks on a storage medium.

SUMMARY

Systems, methods, devices, circuits for data processing, and more particularly to systems and methods for processing skew tolerant processing of data derived from multiple read heads.

Various embodiments of the present invention provide data processing systems that include: a buffer circuit, a selector circuit, and a joint equalizer circuit. The buffer circuit is operable to store a first set of digital samples derived from a first read head as a buffered data set. The selector circuit is operable to select one of the buffered data set or the first set of digital samples as a processing output. The joint equalizer circuit is operable to apply a joint equalization algorithm to a combination of a processing output and a second set of digital samples derived from a second read head to yield an equalized output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 1h-1j show example orientations of a read/write head assembly relative to tracks on a storage medium for different radial positions on the storage medium that may occur in relation to various multiple input, multiple output embodiments of the present invention;

FIG. 1k-1m depict examples of data sensed from tracks on a storage medium by two different read heads in a multiple input, multiple output embodiment where buffering may be used to allow for a skew angle resulting in each of the read heads sensing information from a different track;

DETAILED DESCRIPTION OF SOME EMBODIMENTS

Figure 1A:
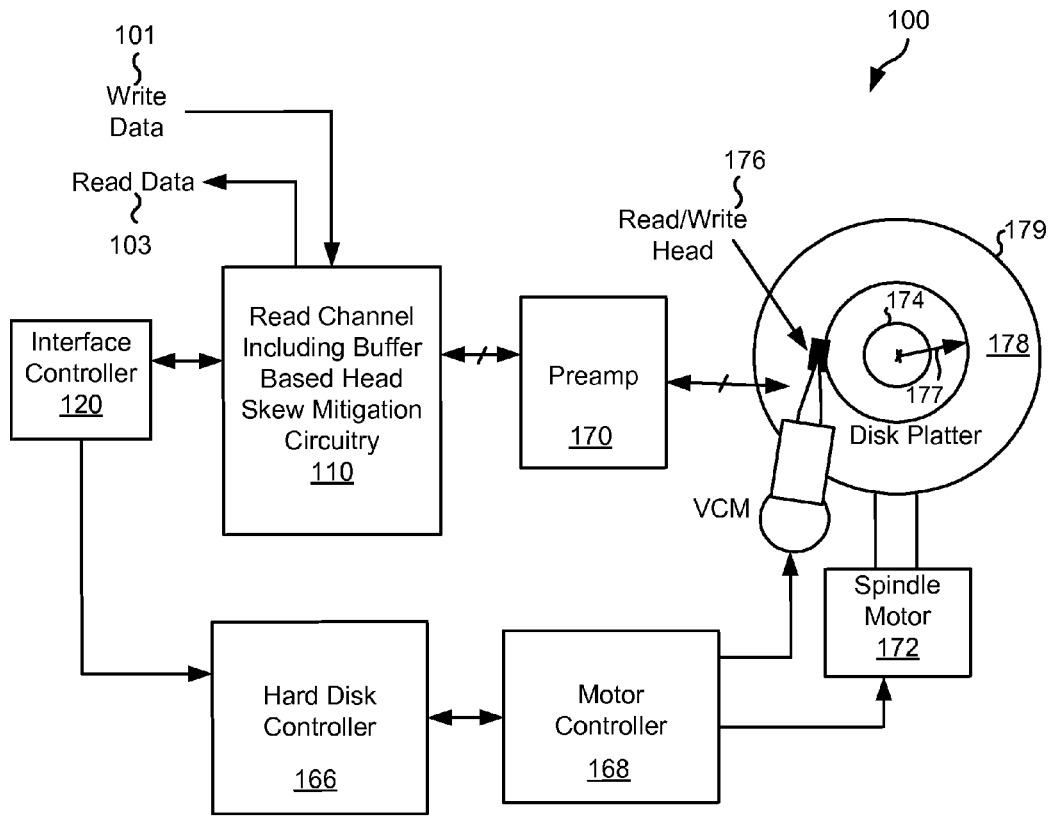
FIG. 1a shows a storage system including buffer based head skew mitigation circuitry in accordance with some embodiments of the present invention.

Systems, methods, devices, circuits for determining a location of a read/write head relative to a storage medium.

Various embodiments of the present invention provide data processing systems that include: a buffer circuit, a selector circuit, and a joint equalizer circuit. The buffer circuit is operable to store a first set of digital samples derived from a first read head as a buffered data set. The selector circuit is operable to select one of the buffered data set or the first set of digital samples as a processing output. The joint equalizer circuit is operable to apply a joint equalization algorithm to a combination of a processing output and a second set of digital samples derived from a second read head to yield an equalized output.

In some instances of the aforementioned embodiments, the data processing system is implemented as part of a storage device that includes a storage medium having at least a first track located at a radius from a center of the storage medium. The first read head is disposed at least partially over the first track. In such instances, selection between the buffered data set and the first set of digital samples is based at least in part on the radius. In some cases, when the radius indicates a location near the center of the storage medium the buffered data set is selected as the processing output, and when the radius indicates a location near an outer edge of the storage medium the first set of digital samples is selected as the processing output. In various cases, the buffer circuit is large enough to store data from one full track near the center of the storage medium, and is not large enough to store data from one full track near an outer edge of the storage medium.

In one or more instances of the aforementioned embodiments, the data processing system is implemented as part of a storage device that includes a storage medium having at least a first track and a second track. The first read head is disposed over the first track and the second read head is disposed over the second track. In some such cases, the processing output is selected as the buffered data set. In various cases, the buffered data set corresponds to data derived by the first read head during a prior rotation of the storage medium when the first read head was disposed over the second track. In some instances of the aforementioned embodiments, the data processing system is implemented as part of a storage device that includes a storage medium having at least a first track and a second track, and both the first read head is disposed over the first track and the second read head is disposed over the first track. In some cases, the processing output is selected as the first set of digital samples.

In various instances of the aforementioned embodiments, the joint equalizer circuit is a first joint equalizer circuit having a target corresponding to the second set of digital samples, and the system further includes a second joint equalizer circuit operable to apply a joint equalization algorithm to the combination of the processing output and the second set of digital samples. The second joint equalizer circuit has a target corresponding to the first set of digital samples. In some such instances, the data processing system is implemented as part of a storage device that includes a storage medium having at least a first track located at a radius from a center of the storage medium and a second track. The selection between the buffered data set and the first set of digital samples is based at least in part on the radius. In some cases, the system further includes a controller circuit operable to disable the second joint equalizer circuit based at least in part on the radius. In one particular case, the controller circuit disables the second joint equalizer circuit when the radius indicates a location where the first read head is disposed over the first track and the second read head is disposed partially over both the first track and the second track.

Other embodiments of the present invention provide methods for data processing that include: receiving a first set of digital samples derived from a first read head; receiving a second set of digital samples derived from a second read head; buffering the first set of digital samples as a buffered data set; selecting one of the buffered data set or the first set of digital samples as a processing output; and applying a joint equalization algorithm using a joint equalizer circuit to a combination of the processing output and a second set of digital samples derived from a second read head to yield an equalized output. In some instances, the methods further include providing a storage medium having at least a first track located at a radius from a center of the storage medium. The first read head is disposed at least partially over the first track, and selection between the buffered data set and the first set of digital samples is based at least in part on the radius. In some cases when the radius indicates a location near the center of the storage medium, the buffered data set is selected as the processing output. In other cases when the radius indicates a location near an outer edge of the storage medium, the first set of digital samples is selected as the processing output. In various cases, the buffer circuit is large enough to store data from one full track near the center of the storage medium, and is not large enough to store data from one full track near an outer edge of the storage medium.

In one or more instances of the aforementioned embodiments, the methods further include providing a storage medium having at least a first track and a second track. When the first read head is disposed over the first track and the second read head is disposed over the second track, the processing output is selected as the buffered data set. In some instances of the aforementioned embodiments, the joint equalizer circuit is a first joint equalizer circuit having a target corresponding to the second set of digital samples. In such instances, the methods may further include applying the joint equalization algorithm using a second joint equalizer circuit to the combination of the processing output and the second set of digital samples to yield a second equalized output. The second joint equalizer circuit has a target corresponding to the first set of digital samples. In some such cases, the method further includes providing a storage medium having at least a first track located at a radius from a center of the storage medium and a second track. Selection between the buffered data set and the first set of digital samples is based at least in part on the radius. In particular cases, the methods further include disabling the second joint equalizer circuit based at least in part on the radius.

Turning to FIG. 1a, a storage system 100 including a read channel circuit 110 having buffer based head skew mitigation circuitry in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme. The data on disk platter 178 is stored as tracks that are located between an inner diameter 174 and an outer diameter 179. At a radius somewhere between inner diameter 174 and outer diameter 179 a skew angle of read/write head assembly 176 relative to the track at the particular diameter is zero degrees, with the skew angle increasing as read/write head assembly approaches the extremes of outer diameter 179 and inner diameter 174.

In some embodiments of the present invention, track pitch (i.e., distance between tracks) and skew angle between a transitional diameter 177 and outer diameter 179 are designed to allow for two reader heads on read/write head assembly 176 to sense data from the same track. In contrast, the track pitch and skew angle between inner diameter 174 and transitional diameter 177 result in read heads on read/write head assembly 176 sensing data from different tracks. In this different track scenario, data buffering is enabled to allow for alignment of data from different tracks prior to processing. In some operations, only a single track is buffered. Tracks between inner diameter 174 and transitional diameter 177 are selected for buffering rather than tracks closer to the outer diameter as there is less data on a track closer to the inner diameter, and thus the amount of buffered required is reduced.

Figure 1B:
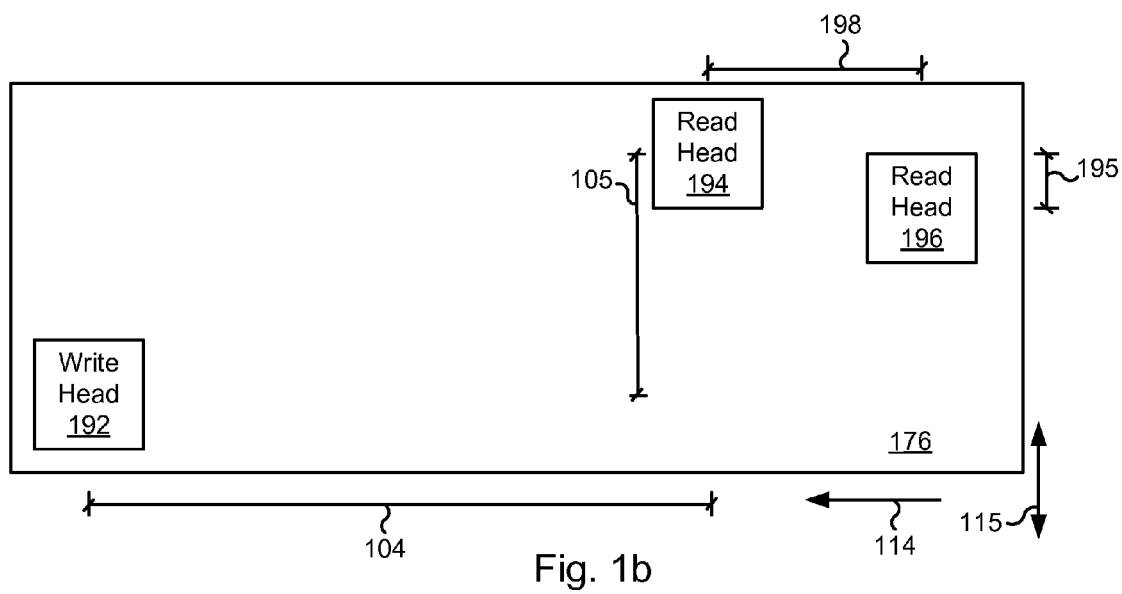
FIG. 1b shows an example distribution of two read heads and a write head disposed as part of a read/write head assembly that may be used in relation to various embodiments of the present invention.

In a typical read operation, read/write head assembly 176 is accurately positioned by motor controller 168 over one or more tracks on disk platter 178. Read/write head assembly 176 includes two or more read heads capable of sensing data from two or more tracks at the same time, or for sensing multiple instances of the same track. An example of read/write assembly 176 is shown in FIG. 1b. Turning to FIG. 1b, an example of read/write head assembly 176 is shown that includes two read heads 194, 196 that are physically separated in a down track direction 114 by a distance 198, and in a cross track direction 115 by a distance 195. Read/write head assembly 176 moves over the surface of a storage medium (e.g., disk platter 178) in down track direction 114 as it is sensing data from a given track. As read/write head assembly 176 is moved between tracks it is moved in cross track direction 115. Each of read heads 194, 196 are capable of sensing information from disk platter 178. In addition, read/write head assembly 176 includes a write head 192 that is capable of writing data to disk platter 178. It should be noted that distances 195, 198 between read heads 194, 196 and distances 104, 105 between read heads 194, 196 and write head 192 are not drawn to proportion. As an example, distance 198 may be on the order of 100 nm, and distance 104 may be between 2-5 μm. Distance 195 may be less than the width of a track on disk platter 178, and distance 105 may be, for example, on the order of 100 track widths. Thus, FIG. 1b is intended to show the specific elements included in read/write head assembly, but the drawing is grossly out of proportion.

Figure 1C:
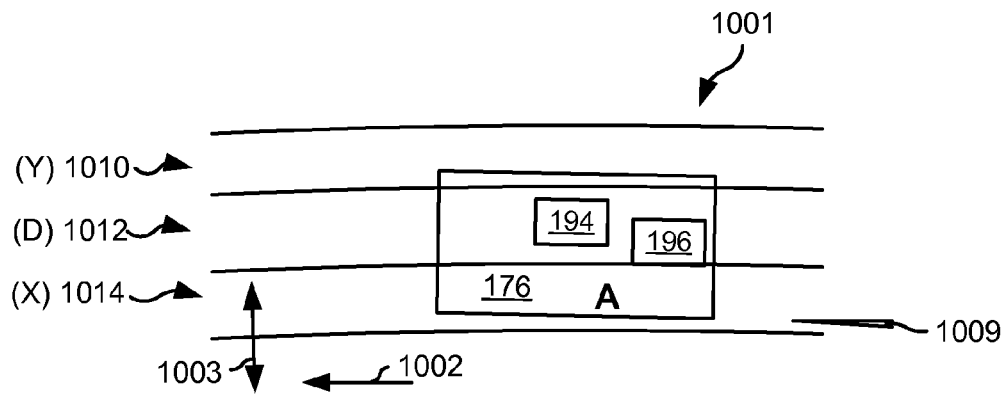
FIGS. 1c-1e show example orientations of a read/write head assembly relative to tracks on a storage medium for different radial positions on the storage medium that may occur in relation to various embodiments of the present invention.
Figure 1D:
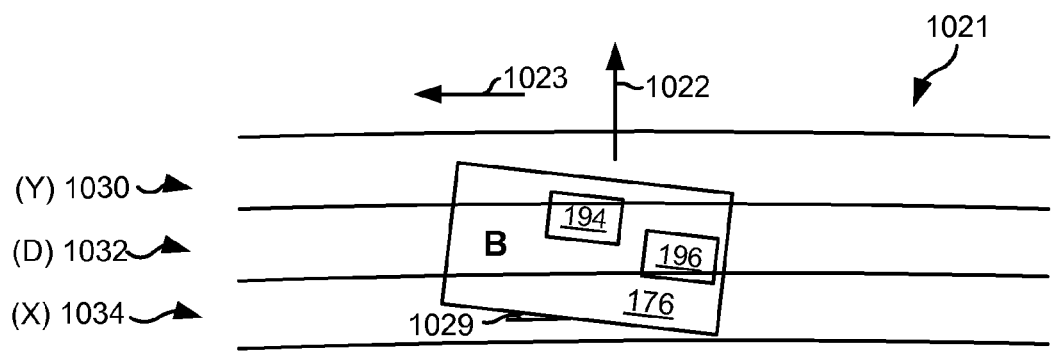
Figure 1E:
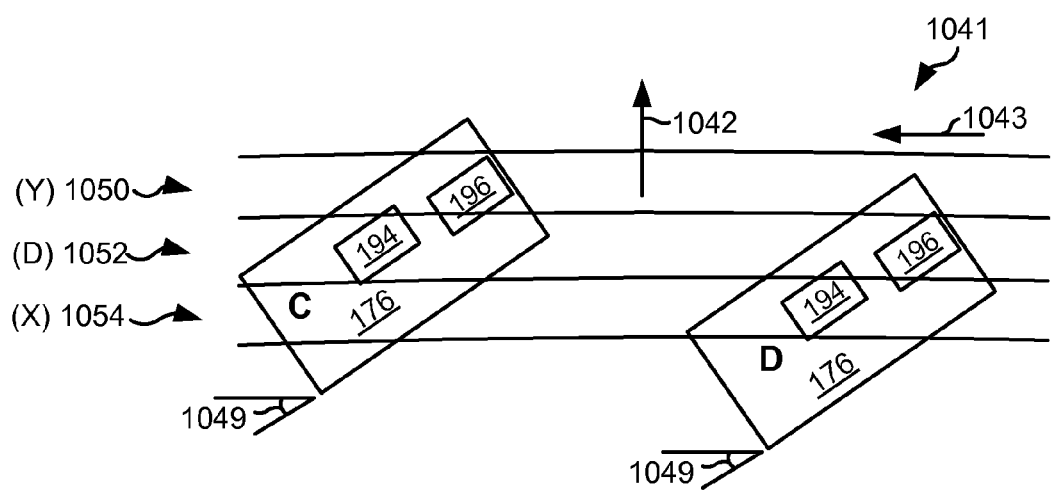

Turning to FIGS. 1c-1e, example orientations of a read/write head assembly 176 relative to tracks on disk platter 178 are shown for different radial positions on disk platter 178 that may occur in relation to various embodiments of the present invention. Turning to FIG. 1c, an example orientation 1001 is shown of read/write head assembly 176 relative to a track 1010 (indicated as storing "Y" Data), a track 1012 (indicated as storing "D" Data), and a track 1014 (indicated as storing "X" Data) on disk platter 178. As shown, read/write head assembly 176 traverses disk platter 178 in a down track direction 1002 and a cross track direction 1003. Orientation 1001 includes tracks 1010, 1012, 1014 in a middle region between outside diameter 179 and transitional diameter 177 where a very small skew angle 1009 (i.e., an angle of read/write head assembly 176 to the down track direction) is exhibited.

Turning to FIG. 1d, an example orientation 1021 is shown of read/write head assembly 176 relative to a track 1030 (indicated as storing "Y" Data), a track 1032 (indicated as storing "D" Data), and a track 1034 (indicated as storing "X" Data) on disk platter 178. As shown, read/write head assembly 176 traverses disk platter 178 in a down track direction 1023 and a cross track direction 1022. Orientation 1021 is close to outer diameter 179 where a medium skew angle 1029 occurs which, while allowing both read head 194 and read head 196 to be placed substantially over the same track, an increase in the skew angle would not allow for data to be derived from the same track using both read head 194 and read head 196.

Turning to FIG. 1e, an example orientation 1041 is shown of read/write head assembly 176 relative to a track 1050 (indicated as storing "Y" Data), a track 1052 (indicated as storing "D" Data), and a track 1054 (indicated as storing "X" Data) on disk platter 178. As shown, read/write head assembly 176 traverses disk platter 178 in a down track direction 1043 and a cross track direction 1042. Read write head assembly 176 is shown twice—once in a position labeled C and the other in a position labeled D. Position labeled C shows the cross-track location of read/write head assembly 176 during one rotation of disk platter 178, and position labeled D shows the cross-track location of read/write head assembly 176 during a subsequent rotation of disk platter 178. Orientation 1041 is between transitional diameter 177 and inner diameter 174 where a large skew angle 1049 occurs which does not allow read head 194 to be placed reliably over the same track as read head 196. This situation requires buffering of data sensed from one head, and alignment of the buffer data with data derived from the other head on a subsequent rotation of disk platter 178.

Figure 1F:
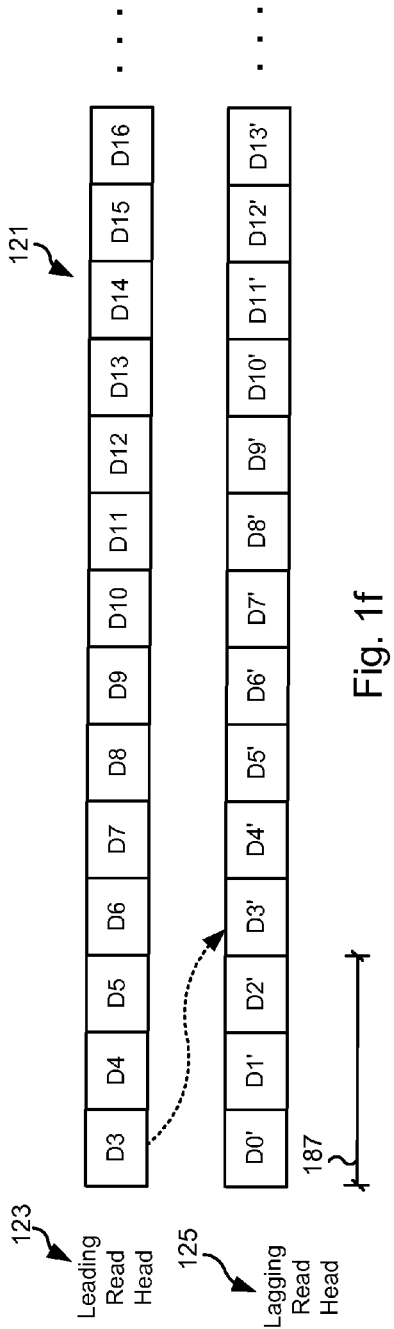
FIG. 1f depicts an example of data sensed from the same track of a storage medium by two different read heads.

Turning to FIG. 1f, a timing diagram 121 of data sensed from the same track of a storage medium (e.g., track 1012 yielding "D" Data) by read head 194 and read head 196 is shown in accordance with various embodiments of the present invention. As shown, there is a delay 187 between data sensed by a leading read head 123 (e.g., read head 194) and a lagging read head 125 (e.g., read head 196) due the physical separation of the read heads in the down track direction. As indicated by a dashed line, the data of the same numbers (e.g., D3 and D3', D4 and D4', etc.) correspond from data sampled from approximately the same location on disk platter 178 by the different read heads. The difference between the corresponding samples is indicated by identifying the data derived from leading read head 123 with just a number (e.g., D3) and the corresponding data derived from lagging read head 125 with the same number and the prime symbol (e.g., D3'). Three sources result in the differences between the corresponding data elements (e.g., D3 and D3'): (1) a difference in a cross track direction where the data is sampled by one read head verses the other, (2) the physical distance between the two read heads is not necessarily an integer multiple of a sampling clock, and (3) differences in noise introduced by the two different read heads. Timing diagram 121 corresponds to the data provided by read/write head assembly 176 for tracks on disk platter 178 between transitional diameter 177 and outer diameter 179.

Figure 1G:
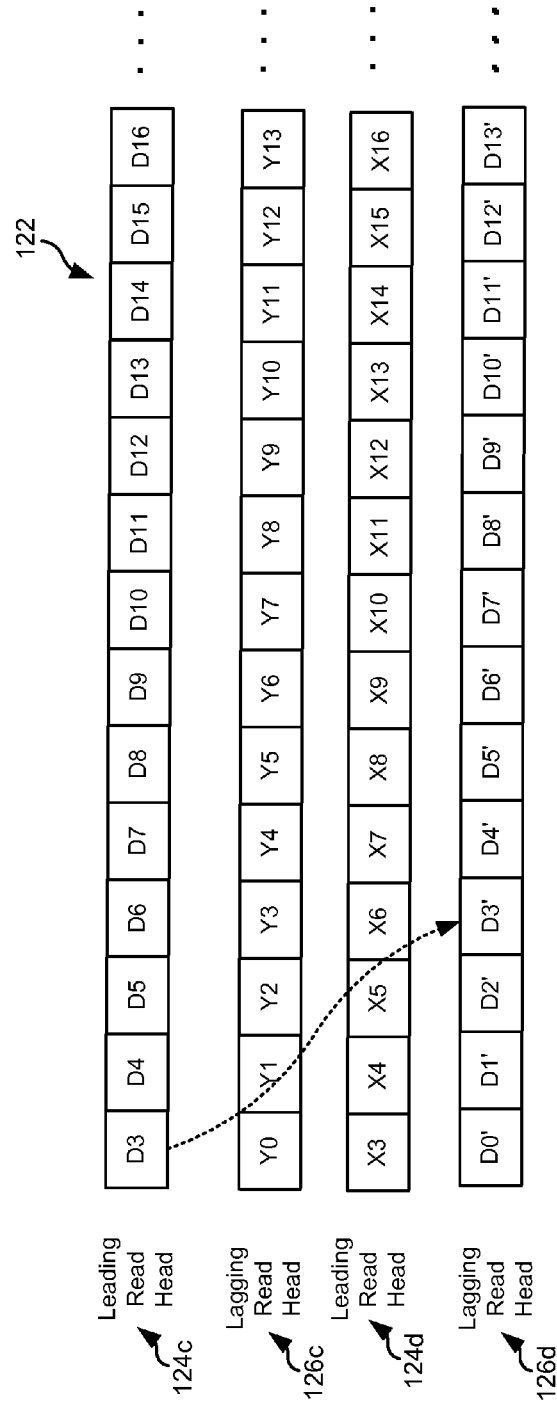
FIG. 1g depicts another example of data sensed from tracks of a storage medium by two different read heads where buffering is used to allow for a skew angle resulting in each of the read heads sensing information from a different track.

Turning to FIG. 1g, another timing diagram 122 of data sensed from tracks (e.g., track 1050 yielding "Y" Data; track 1052 yielding "D" Data, and track 1054 yielding "X" Data) of a storage medium by two different read heads where buffering is used to allow for a skew angle resulting in each of the read heads sensing information from a different track. During one rotation of disk platter 178, a leading read head 124 is disposed over a first track yielding "D" data (D3, D4, D5 . . . ) (indicated by a number 124c which suggests, as an example, the C orientation of read/write head assembly 176 in FIG. 1e), and a lagging read head 126 is disposed over a second track yielding "Y" data (Y0, Y1, Y2 . . . ) (indicated by a number 126c which again suggests, as an example, the C orientation of read/write head assembly 176 in FIG. 1e). During a subsequent rotation of disk platter 178, leading read head 124 is disposed over a third track yielding "X" data (X3, X4, X5 . . . ) (indicated by a number 124d which suggests, as an example, the D orientation of read/write head assembly 176 in FIG. 1e), and lagging read head 126 is disposed over the second track yielding "D" data (D0', D1', D2'...) (indicated by a number 126d which again suggests, as an example, the D orientation of read/write head assembly 176 in FIG. 1e).

Turing to FIGS. 1h-1j, example orientations of a read/write head assembly 176 relative to tracks on disk platter 178 are shown for different radial positions on the storage medium that may occur in relation to various multiple input, multiple output embodiments of the present invention. Turning to FIG. 1h, an example orientation 1151 is shown of read/write head assembly 176 relative to a track 1160 (indicated as storing "W" Data), a track 1162 (indicated as storing "X" Data), a track 1164 (indicated as storing "D" Data), and a track 1166 (indicated as storing "Y" Data) on disk platter 178. As shown, read/write head assembly 176 traverses disk platter 178 in a down track direction 1152 and a cross track direction 1153. Read write head assembly 176 is shown twice—once in a position labeled E and the other in a position labeled F. Position labeled E shows the cross-track location of read/write head assembly 176 during one rotation of disk platter 178, and position labeled F shows the cross-track location of read/write head assembly 176 during a subsequent rotation of disk platter 178. Orientation 1151 includes tracks 1160, 1162, 1164, 1166 in a region between outside diameter 179 and inside diameter 174 where a skew angle results in read head 194 being reasonably centered on one track and read head 196 being reasonably centered on the next track. As shown, in these tracks, the read heads fit well across separated tracks. In this situation, two tracks are processed together without buffering.

Turning to FIG. 1i, an example orientation 1101 is shown of read/write head assembly 176 relative to a track 1110 (indicated as storing "W" Data), a track 1112 (indicated as storing "X" Data), a track 1114 (indicated as storing "D" Data), and a track 1116 (indicated as storing "Y" Data) on disk platter 178. As shown, read/write head assembly 176 traverses disk platter 178 in a down track direction 1102 and a cross track direction 1103. Read write head assembly 176 is shown twice—once in a position labeled A and the other in a position labeled B. Position labeled A shows the cross-track location of read/write head assembly 176 during one rotation of disk platter 178, and position labeled B shows the cross-track location of read/write head assembly 176 during a subsequent rotation of disk platter 178. Orientation 1101 includes tracks 1110, 1112, 1114, 1116 in a middle region between outside diameter 179 and inside diameter 174 where a very small skew angle 1109 is exhibited. As shown, in these middle tracks where the skew angle is small, the read heads do not fit well across separated tracks (e.g., read head 194 is misaligned with the tracks, while read head 196 is aligned with the tracks). In this situation, buffering can be used to enhance performance.

Turning to FIG. 1j, an example orientation 1121 is shown of read/write head assembly 176 relative to a track 1130 (indicated as storing "W" Data), a track 1132 (indicated as storing "X" Data), a track 1134 (indicated as storing "D" Data), a track 1136 (indicated as storing "Y" Data), and a track 1138 (indicated as storing "Z" Data) on disk platter 178. As shown, read/write head assembly 176 traverses disk platter 178 in a down track direction 1122 and a cross track direction 1123. Read write head assembly 176 is shown twice times—once in a position labeled C, and once in a position labeled D. Position labeled C shows the cross-track location of read/write head assembly 176 during one rotation of disk platter 178, position labeled D shows the cross-track location of read/write head assembly 176 during a subsequent rotation of disk platter 178. Orientation 1121 includes tracks 1130, 1132, 1134, 1136, 1138 in an inner region near inside diameter 179 where a very small skew angle 1129 is exhibited. As shown, in these inner diameter tracks where the skew angle is relatively large (while not specifically shown, the same is true for outer diameter tracks), the read heads fit well across separated tracks (e.g., both read head 194 and read head 196 are aligned with a respective track).

Turning to FIG. 1k a timing diagram 1522 of data sensed from different tracks of a storage medium. In particular, during one rotation of disk platter 178, leading read head 1524e (the 'e' in the number indicates the E position label on FIG. 1h) senses a first track having "W" data (e.g., track 1160 yielding "W" Data) and a lagging read head 1525e senses a second track having "X" data (e.g., track 1162 yielding "X" Data). During a subsequent rotation of disk platter 178, leading read head 1524f (the 'F' in the number indicates the F position label on FIG. 1h) senses a third track having "D" data (e.g., track 1164 yielding "D" Data) and lagging read head 1525f senses a fourth track having "Y" data (e.g., track 1166 yielding "Y" Data).

Figure 1L:
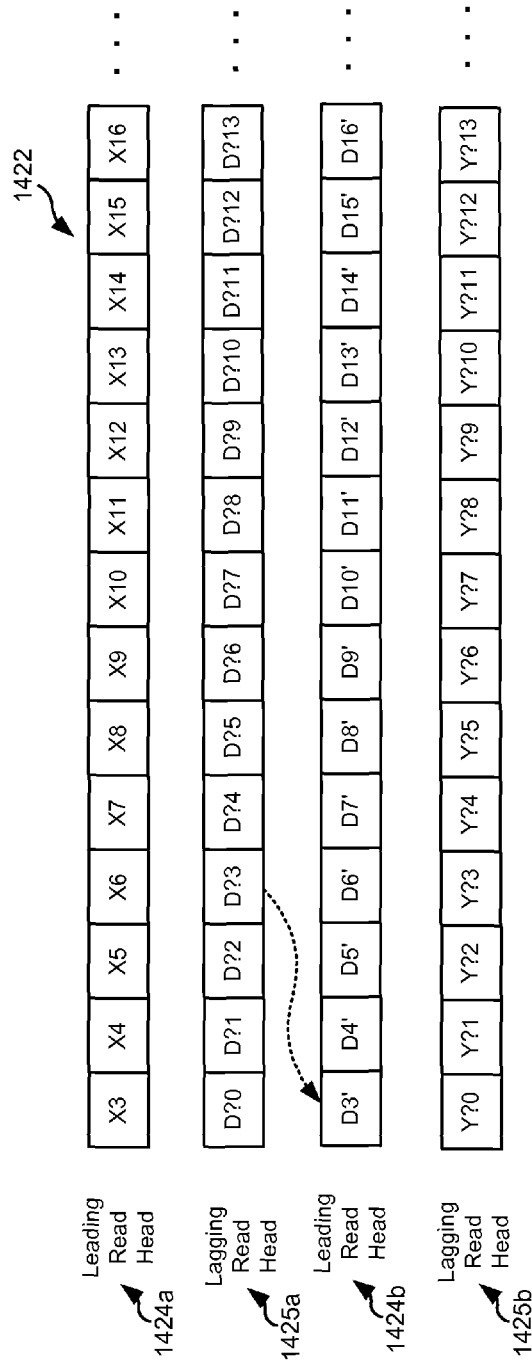

Turning to FIG. 1l a timing diagram 1422 of data sensed from different tracks of a storage medium. In particular, during one rotation of disk platter 178, leading read head 1424a (the 'a' in the number indicates the A position label on FIG. 1i) Senses a First Track Having "D" data (e.g., track 1114 yielding "D" Data) and a lagging read head 1425a is disposed over both a second track and a third track (e.g., between tracks 1110 and 1112 resulting in an ambiguous "W?" Data). During a subsequent rotation of disk platter 178, lagging read head 1425b (the 'b' in the number indicates the B position label on FIG. 1i) senses the first track having "D" data (e.g., track 1114 yielding "D" Data) and leading read head 1424b is disposed over both a fourth track and a fifth track (e.g., between tracks 1116+ resulting in an ambiguous "Y?" Data). As shown, buffering the "D" data sensed by leading read head 1424 during one rotation allows it to be combined with the "D" data sensed by lagging read head 1425 during a subsequent rotation of disk platter 178.

Figure 1M:
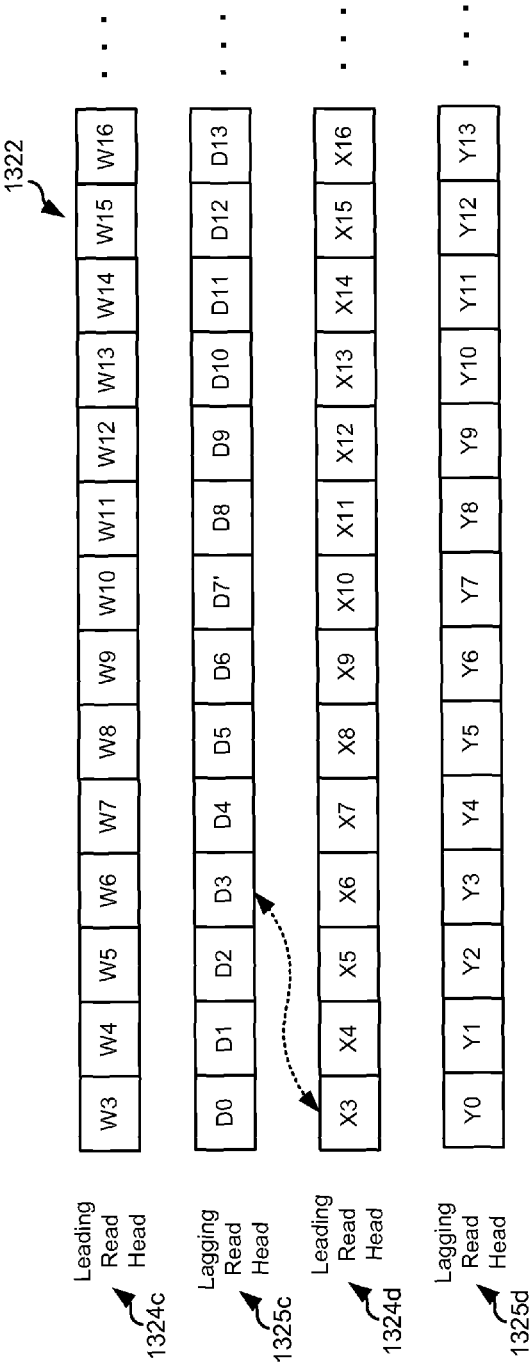

Turning to FIG. 1m a timing diagram 1322 of data sensed from different tracks of a storage medium. In particular, during one rotation of disk platter 178, leading read head 1324c (the 'c' in the number indicates the C position label on FIG. 1i) senses a first track having "W" data (e.g., track 1130 yielding "W" Data) and a lagging read head 1325c senses a second track having "D" data (e.g., track 1134 yielding "D" Data). During a subsequent rotation of disk platter 178, leading read head 1324d (the 'd' in the number indicates the D position label on FIG. 1i) senses a third track having "X" data (e.g., track 1132 yielding "X" Data) and lagging read head 1325d is disposed over both a fourth track having "Y" Data (e.g., track 1136 yielding "Y" Data). As shown, buffering may be eliminated where data from only one head is processed in a multiple in multiple out processing scheme.

Referring again to FIG. 1a, motor controller 168 both positions read/write head assembly 176 in relation to disk platter 178 and drives spindle motor 172 by moving read/write head assembly 176 to the proper data track on disk platter 178 under the direction of hard disk controller 166. Spindle motor 172 spins disk platter 178 at a determined angular velocity (RPMs) that remains substantially constant. The linear velocity (m/s) at which spindle motor 172 moves varies based upon radial distance 177 of read/write head 176 from the center point of disk platter 178 for the track of interest. To make the size of data locations on disk platter 178 similar between inner diameter 174 and outer diameter 179 of disk platter 178, the linear velocity of disk platter 178 is increased as read/write head assembly 176 moves from inner diameter 174 toward outer diameter 179 of disk platter 178. This linear velocity information 173 is provided to the radial location estimating circuitry of read channel circuit 110.

Once read/write head assembly 176 is positioned adjacent to a desired track of disk platter 178 (e.g., track 155), magnetic signals representing data on the track are sensed by read/write head assembly 176 as disk platter 178 is rotated by spindle motor 172. The stream of sensed magnetic signals are provided as a continuous analog signal representative of the magnetic data on the track of disk platter 178. This stream of analog signals is transferred from read/write head assembly 176 to read channel circuit 110 via preamplifier 170. Preamplifier 170 is operable to amplify the analog signals accessed from disk platter 178. In turn, read channel circuit 110 decodes and digitizes the received analog signals to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read of data from disk platter 178, data is received from read head 194 and read head 196. The data from each of read head 194 and read head 196 are used to process the received data. The processing of the data depends upon where the data is located on disk platter 178. The data processing of read channel circuit 110 may be done using a system similar to one of those discussed below in relation to FIGS. 2-3.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
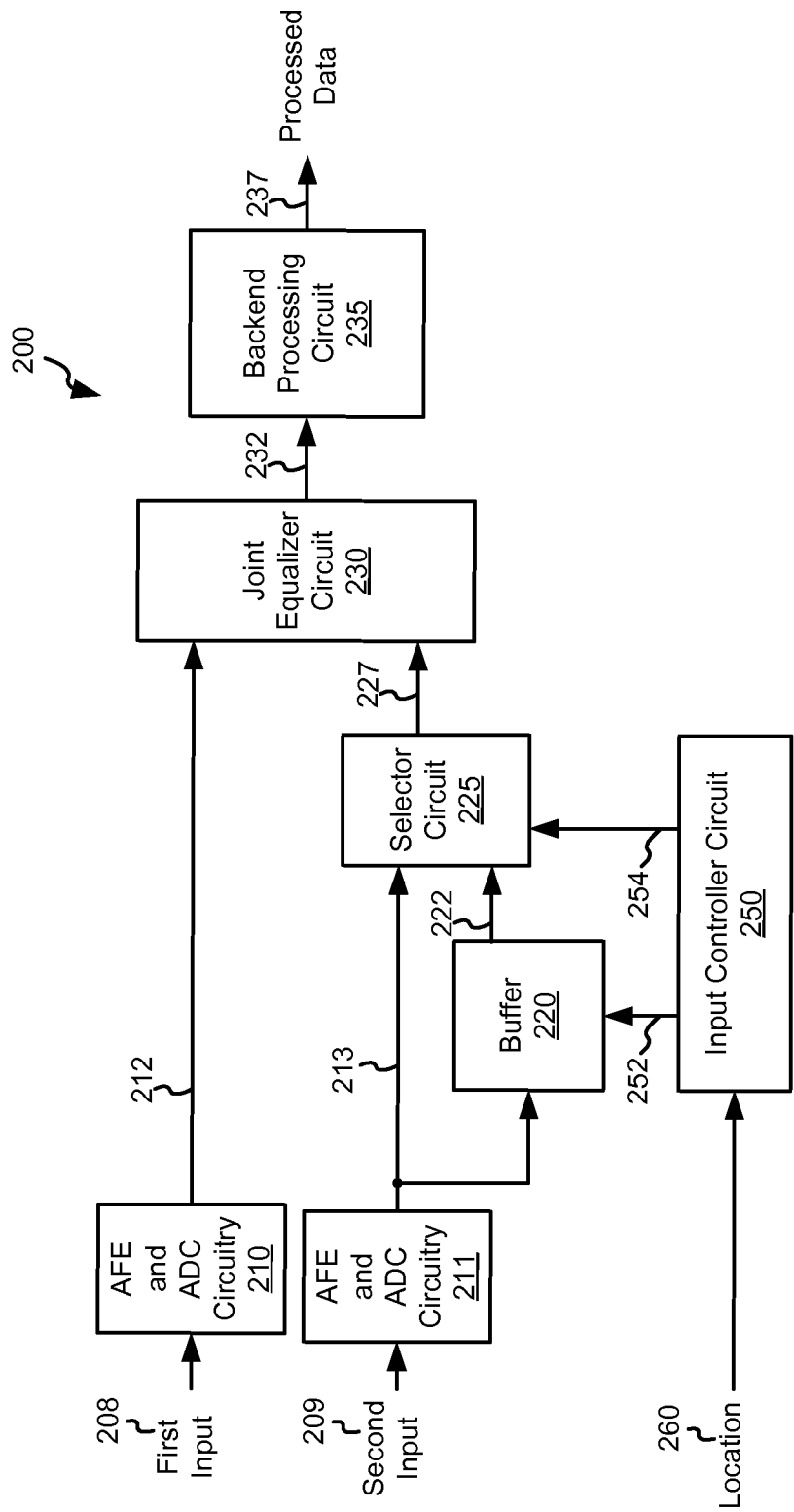
FIG. 2 depicts a skew angle tolerant data processing circuit in accordance with various embodiments of the present invention.

Turning to FIG. 2, a skew angle tolerant data processing circuit 200 is shown in accordance with various embodiments of the present invention. Skew angle tolerant data processing circuit 200 is particularly tailored for processing data derived from head orientations such as those discussed above in relation to FIGS. 1c-1e where buffering is used only for data derived from tracks located between transitional diameter 177 and inner diameter 174. In particular, skew angle tolerant data processing circuit 200 includes a buffer 220 that is of sufficient size to buffer data derived from a track between transitional diameter 177 and inner diameter 174 for one complete rotation of disk platter 178. An input controller circuit 250 provides a control signal 252 to buffer 220 causing it to store digital samples 213 derived from one read head (i.e., the source of a second input 211), and to provide a buffered output 222 to a selector circuit 225. In addition, input controller circuit 250 provides a control signal 254 to a selector circuit 225 that causes selector circuit 225 to select one of buffered output 222 or digital samples 213 as a processing output 227. As more fully described below, assertion of control signal 254 is based upon a location input 260 that indicates a radial location on disk platter 178 of a track from which data is being accessed.

In addition, skew angle tolerant data processing circuit 200 includes analog front end and analog to digital conversion circuitry 210 that receives a first input 208 (i.e., an input from a first read head) and provides corresponding digital samples 212. The analog front end circuitry processes first input 208 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 212 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 212 are provided to a joint equalizer circuit 230.

Similarly, skew angle tolerant data processing circuit 200 includes analog front end and analog to digital conversion circuitry 211 that receives second input 209 (i.e., an input from a first read head) and provides corresponding digital samples 213. The analog front end circuitry processes second input 209 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 213 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. As discussed above, digital samples 213 are provided to both buffer 220 and selector circuit 225. In turn, selector circuit 225 provides processing output 227 to joint equalizer circuit 230.

Joint equalizer circuit 230 is operable to align digital samples 212 with corresponding elements of processing output 227. The two sets of data are then equalized together to yield an equalized output 232. Joint equalizer circuit 230 may be any circuit known in the art that is capable of equalizing multiple sets of corresponding data. Based upon the disclosure provided herein, one of ordinary skill in the art will recognize a variety of joint equalizers that may be used in relation to different embodiments of the present invention. Equalized output 232 is provided to a backend processing circuit 235 that applies one or more processing algorithms to recover data originally stored to disk platter 178 and to provide the recovered data as processed data 237. Backend processing circuit 235 may include, for example, a maximum a posteriori data detection circuit as is known in the art and a low density parity check decoder circuit as is known in the art. Based upon the disclosure provided herein, one of ordinary skill in the art will recognize a variety of backend processing circuitry that may be used in relation to different embodiments of the present invention.

In operation, read/write head assembly 176 is disposed over one or more target tracks on disk platter 178, and a radial location of the target track(s) is provided as a location 260 to input controller circuit 250. As disk platter 178 rotates, read heads sense data and provide a signal corresponding to the sensed data as first input 208 and second input 209, respectively. This received data is converted into respective sets of digital samples 212, 213.

Where location 260 indicates the location of the target track(s) is/are between transitional diameter 177 and outer diameter 179, input controller circuit 250 selects digital samples 213 as processing output 227. This situation corresponds to the orientations of FIGS. 1c-1d where the same track is being sensed by both of the read heads supplying first input 208 and second input 209. Joint equalizer circuit 230 applies its joint equalization algorithm to yield equalized output 232 which in turn is processed by backend processing circuit 235 to yield processed data 237.

Alternatively, where location 260 indicates the location of the target track(s) is/are between transitional diameter 177 and inner diameter 179 buffered processing is enabled. This buffered processing applies to the orientations of FIG. 1e where the read heads are disposed over different tracks on disk platter 178. Thus, during one revolution of disk platter 178, first input 208 corresponds to data from a first track of disk platter 178 (e.g., track 1050 of FIG. 1e) and second input 209 corresponds to data from a second track of disk platter 178 (e.g., track 1052 of FIG. 1e). During this revolution of disk platter 178, input controller circuit 250 causes digital samples 213 (corresponding to data from the second track of disk platter 178) to be stored to buffer 220.

During a subsequent revolution of disk platter 178, first input 208 corresponds to data from the second track of disk platter 178 (e.g., track 1052 of FIG. 1e) and second input 209 corresponds to data from a third track of disk platter 178 (e.g., track 1054 of FIG. 1e). During this revolution of disk platter 178, input controller circuit 250 again causes digital samples 213 (corresponding to data from the third track of disk platter 178) to be stored to buffer 220, while at the same time the previously buffered data samples from the second track are accessed and provided as buffered output 222 to selector circuit 225. Input controller circuit 250 selects buffered output (again, data samples from the second track) to be provided as processing output 227. Joint equalizer circuit 230 applies its joint equalization algorithm to yield equalized output 232 which in turn is processed by backend processing circuit 235 to yield processed data 237.

Figure 3:
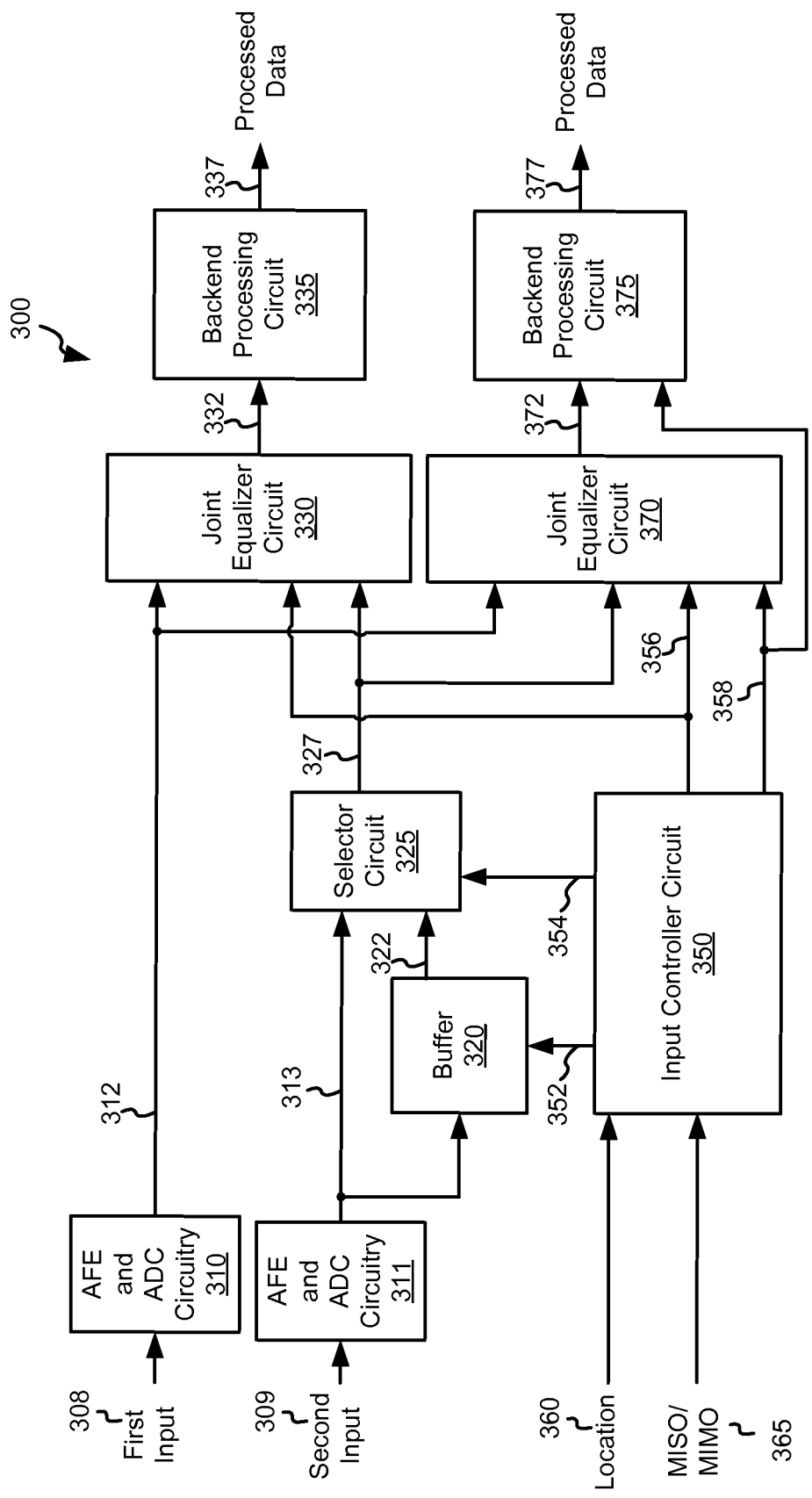
FIG. 3 depicts another skew angle tolerant data processing circuit in accordance with other embodiments of the present invention.

Turning to FIG. 3, another skew angle tolerant data processing circuit 300 is shown in accordance with other embodiments of the present invention. Skew angle tolerant data processing circuit 300 is tailored for processing data derived from head orientations such as those discussed above in relation to FIGS. 1c-1e where buffering is used only for data derived from tracks located between transitional diameter 177 and inner diameter 174, and for orientations such as those discussed above in relation 1h-1i where buffering is used only for data derived from tracks located in a mid-region between outer diameter 179 and inner diameter 174 where skew angles are small. In particular, skew angle tolerant data processing circuit 300 includes a buffer 320 that is of sufficient size to buffer data derived from a track from the largest diameter of the mid-region for one complete rotation of disk platter 178. An input controller circuit 350 provides a control signal 352 to buffer 320 causing it to store digital samples 313 derived from one read head (i.e., the source of a second input 311), and to provide a buffered output 322 to a selector circuit 325. In addition, input controller circuit 350 provides a control signal 354 to a selector circuit 325 that causes selector circuit 325 to select one of buffered output 322 or digital samples 313 as a processing output 327. As more fully described below, assertion of control signal 354 is based upon a location input 360 that indicates a radial location on disk platter 178 of a track from which data is being accessed. Yet further, input controller circuit 350 provides a control signal 356 to a joint equalizer circuit 330 causing it to operate with a set of targets designed for use in relation to the inputs (e.g., to equalize to the data provided as digital samples 312). Input controller circuit 350 provides control signal 356 to a joint equalizer circuit 370 causing it to operate with a set of targets designed for use in relation to the inputs (e.g., to equalize to the data provided as processing output 327).

In some cases both joint equalizer circuit 330 and joint equalizer circuit 370 operate in parallel on the same inputs with one joint equalizer circuit using a set of equalization targets directed at one input (e.g., to equalize to the data provided as digital samples 312) and another set of equalization targets directed at the other input (e.g., to equalize to the data provided as processing output 327). In this case, input controller circuit 350 asserts an enable signal 358 that is provided to enable both joint equalizer circuit 370 and backend processing circuit 375. In contrast, in other cases, only joint equalizer circuit 330 is operating. In such a case, input controller circuit 350 de-asserts enable signal 358 which in turn disables both joint equalizer circuit 370 and backend processing circuit 375.

In addition, skew angle tolerant data processing circuit 300 includes analog front end and analog to digital conversion circuitry 310 that receives a first input 308 (i.e., an input from a first read head) and provides corresponding digital samples 312. The analog front end circuitry processes first input 308 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 312 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 312 are provided to a joint equalizer circuit 330.

Similarly, skew angle tolerant data processing circuit 300 includes analog front end and analog to digital conversion circuitry 311 that receives second input 309 (i.e., an input from a first read head) and provides corresponding digital samples 313. The analog front end circuitry processes second input 309 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 313 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. As discussed above, digital samples 313 are provided to both buffer 320 and selector circuit 325. In turn, selector circuit 325 provides processing output 327 to joint equalizer circuit 330 and to joint equalizer circuit 370.

Both joint equalizer circuit 330 and joint equalizer circuit 370 are operable to align digital samples 312 with corresponding elements of processing output 327. The two sets of data are then equalized together to yield an equalized output 332 and equalized output 372, respectively. Joint equalizer circuit 330 and joint equalizer circuit 370 may be any circuits known in the art that is capable of equalizing multiple sets of corresponding data. Based upon the disclosure provided herein, one of ordinary skill in the art will recognize a variety of joint equalizers that may be used in relation to different embodiments of the present invention. Equalized output 332 is provided to a backend processing circuit 335 that applies one or more processing algorithms to recover data originally stored to disk platter 178 and to provide the recovered data as processed data 337. Backend processing circuit 335 may include, for example, a maximum a posteriori data detection circuit as is known in the art and a low density parity check decoder circuit as is known in the art. Similarly, equalized output 372 is provided to a backend processing circuit 375 that applies one or more processing algorithms to recover data originally stored to disk platter 178 and to provide the recovered data as processed data 377. Backend processing circuit 375 may include, for example, a maximum a posteriori data detection circuit as is known in the art and a low density parity check decoder circuit as is known in the art. Based upon the disclosure provided herein, one of ordinary skill in the art will recognize a variety of backend processing circuitry that may be used in relation to different embodiments of the present invention.

In operation, read/write head assembly 176 is disposed over one or more target tracks on disk platter 178, and a radial location of the target track(s) is provided as a location 360 to input controller circuit 350. As disk platter 178 rotates, read heads sense data and provide a signal corresponding to the sensed data as first input 308 and second input 309, respectively. This received data is converted into respective sets of digital samples 312, 313.

Where a MISO/MIMO input signal 365 indicates a multiple input single output processing scenario (i.e., only processed data 337 will be provided) and location 360 indicates the location of the target track(s) is/are between transitional diameter 177 and outer diameter 179, input controller circuit 350 selects digital samples 313 as processing output 327. This situation corresponds to the orientations of FIGS. 1c-1d where the same track is being sensed by both of the read heads supplying first input 308 and second input 309. Joint equalizer circuit 330 applies its joint equalization algorithm to yield equalized output 332 which in turn is processed by backend processing circuit 335 to yield processed data 337.

Alternatively, where MISO/MIMO input signal 365 indicates a multiple input single output processing scenario and location 360 indicates the location of the target track(s) is/are between transitional diameter 177 and inner diameter 179 buffered processing is enabled. This buffered processing applies to the orientations of FIG. 1e where the read heads are disposed over different tracks on disk platter 178. Thus, during one revolution of disk platter 178, first input 308 corresponds to data from a first track of disk platter 178 (e.g., track 1050 of FIG. 1e) and second input 309 corresponds to data from a second track of disk platter 178 (e.g., track 1052 of FIG. 1e). During this revolution of disk platter 178, input controller circuit 350 causes digital samples 313 (corresponding to data from the second track of disk platter 178) to be stored to buffer 320.

During a subsequent revolution of disk platter 178, first input 308 corresponds to data from the second track of disk platter 178 (e.g., track 1052 of FIG. 1e) and second input 309 corresponds to data from a third track of disk platter 178 (e.g., track 1054 of FIG. 1e). During this revolution of disk platter 178, input controller circuit 350 again causes digital samples 313 (corresponding to data from the third track of disk platter 178) to be stored to buffer 320, while at the same time the previously buffered data samples from the second track are accessed and provided as buffered output 322 to selector circuit 325. Input controller circuit 350 selects buffered output (again, data samples from the second track) to be provided as processing output 327. Joint equalizer circuit 330 applies its joint equalization algorithm to yield equalized output 332 which in turn is processed by backend processing circuit 335 to yield processed data 337.

As yet another alternative, where MISO/MIMO input signal 365 indicates a multiple input multiple output processing scenario (i.e., both processed data 337 and processed data 377 will be provided) and location 360 indicates the location of the target track(s) in a region of disk platter 178 where skew angles result in the condition discussed above in relation to FIG. 1h, then standard MIMO processing is performed. This includes receiving first input 308 from one read head that is disposed over one track (e.g., track 1130) and second input 309 from another read head that is disposed over another track (e.g., track 1134). Input controller circuit 350 causes selector circuit 325 to select digital samples 313 as processing output 327.

Input controller circuit 350 causes joint equalizer circuit 330 to apply an equalization algorithm to a combination of digital samples 312 and processing output 327 (selected to be digital samples 313) with a target selected to equalize digital samples 312. This process yields equalized output 332. In addition, input controller circuit 350 causes joint equalizer circuit 370 to apply an equalization algorithm to a combination of digital samples 312 and processing output 327 (selected to be digital samples 313) with a target selected to equalize digital samples 313. This process yields equalized output 372. In turn, backend processing circuit 335 processes equalized output 332 to yield processed data 337, and backend processing circuit 375 processes equalized output 372 to yield processed data 377. By doing this, two tracks of data are processed simultaneously.

As a further alternative, where MISO/MIMO input signal 365 indicates a multiple input multiple output processing scenario (i.e., both processed data 337 and processed data 377 will be provided) and location 360 indicates the location of the target track(s) in a region of disk platter 178 where skew angles result in the condition discussed above in relation to FIG. 1i, input controller circuit 350 disables the operation of joint equalizer circuit 370 and backend processing circuit 375. In such a situation, buffered data 322 is selected by selector circuit 325 as processing output 327. Joint equalizer circuit 330 applies the equalization algorithm to the combination of processing output 327 (i.e., data from read head 196 corresponding to halfway between track 1112 and track 1114 when data from read head 194 corresponds to track 1112) and digital samples 312. This equalization utilizes a target corresponding to the track over which read head 194 is positioned. This equalization results in equalized output 332. During the next rotation, joint equalizer circuit 330 applies the equalization algorithm to the combination of processing output 327 (i.e., data from read head 196 corresponding to half way between track 1114 and track 1116 when data from read head 194 corresponds to track 1114) and digital samples 312. In turn, backend processing circuit 335 processes equalized output 332 to yield processed data 337. In such a case, only one track of data is processed at a time.

As yet a another alternative, where MISO/MIMO input signal 365 indicates a multiple input multiple output processing scenario (i.e., both processed data 337 and processed data 377 will be provided) and location 360 indicates the location of the target track(s) is near an outer region of disk platter 178 where skew angles are relatively large (see e.g., FIG. 1j), then buffered MIMO processing is performed. In this situation, buffered data 322 is selected by selector circuit 325 as processing output 327, and input controller circuit 350 enables the operation of joint equalizer circuit 370 and backend processing circuit 375. Joint equalizer circuit 330 applies the equalization algorithm to the combination of processing output 327 (i.e., data from read head 196 corresponding to track 1132 (previously buffered) when data from read head 194 corresponds to track 1130) and digital samples 312. This equalization utilizes a target corresponding to the track over which read head 194 is positioned. This equalization results in equalized output 332. At the same time, joint equalizer circuit 370 applies the equalization algorithm to the combination of processing output 327 (i.e., data from read head 196 corresponding to track 1132 (previously buffered) when data from read head 194 corresponds to track 1130) and digital samples 312, except that the equalization utilizes a target corresponding to the track from which buffered data 322 was derived. This equalization results in equalized output 372. This process is repeated as the head is moved in a cross-track direction for subsequent rotations of disk platter 178. In turn, backend processing circuit 335 processes equalized output 332 to yield processed data 337, and backend processing circuit 375 processes equalized output 372 to yield processed data 377. By doing this, two tracks of data are processed simultaneously.

It should be noted that while the embodiment shows two distinct backend processing circuits (backend processing circuit 335 and backend processing circuit 375), other embodiments of the present invention may use a single two-dimensional backend processing circuit in place of the two backend processing circuits where the two-dimensional backend processing circuit is operable to process multiple data paths together. As another alternative, signaling may be provided between backend processing circuit 335 and backend processing circuit 375 to allow for operation similar to a two-dimensional equalizer.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a buffer circuit operable to store a first set of digital samples derived from a first read head as a buffered data set;
   a selector circuit operable to select one of the buffered data set or the first set of digital samples as a processing output; and
   a joint equalizer circuit operable to apply a joint equalization algorithm to a combination of the processing output and a second set of digital samples derived from a second read head to yield an equalized output.

2. The data processing system of claim 1, wherein the data processing system is implemented as part of a storage device, wherein the storage device includes a storage medium having at least a first track located at a radius from a center of the storage medium, wherein the first read head is disposed at least partially over the first track, and wherein selection between the buffered data set and the first set of digital samples is based at least in part on the radius.

3. The data processing system of claim 2, wherein when the radius indicates a location near the center of the storage medium the buffered data set is selected as the processing output, and wherein when the radius indicates a location near an outer edge of the storage medium the first set of digital samples is selected as the processing output.

4. The data processing system of claim 2, wherein the buffer circuit is large enough to store data from one full track near the center of the storage medium, and is not large enough to store data from one full track near an outer edge of the storage medium.

5. The data processing system of claim 1, wherein the data processing system is implemented as part of a storage device, wherein the storage device includes a storage medium having at least a first track and a second track, and wherein when the first read head is disposed over the first track and the second read head is disposed over the second track, the processing output is selected as the buffered data set.

6. The data processing system of claim 5, wherein the buffered data set corresponds to data derived by the first read head during a prior rotation of the storage medium when the first read head was disposed over the second track.

7. The data processing system of claim 1, wherein the data processing system is implemented as part of a storage device, wherein the storage device includes a storage medium having at least a first track and a second track, and wherein when both the first read head is disposed over the first track and the second read head is disposed over the first track, the processing output is selected as the first set of digital samples.

8. The data processing system of claim 1, wherein the joint equalizer circuit is a first joint equalizer circuit having a target corresponding to the second set of digital samples, the system comprising:
a second joint equalizer circuit operable to apply a joint equalization algorithm to the combination of the processing output and the second set of digital samples, wherein the second joint equalizer circuit has a target corresponding to the first set of digital samples.

9. The data processing system of claim 8, wherein the data processing system is implemented as part of a storage device, wherein the storage device includes a storage medium having at least a first track located at a radius from a center of the storage medium and a second track, and wherein selection between the buffered data set and the first set of digital samples is based at least in part on the radius.

10. The data processing system of claim 9, the system further comprising:
a controller circuit operable to disable the second joint equalizer circuit based at least in part on the radius.

11. The data processing system of claim 10, wherein the controller circuit disables the second joint equalizer circuit when the radius indicates a location where the first read head is disposed over the first track and the second read head is disposed partially over both the first track and the second track.

12. The data processing system of claim 1, wherein the data processing system is implemented as part of an integrated circuit.

13. A method for data processing, the method comprising:
receiving a first set of digital samples derived from a first read head;
receiving a second set of digital samples derived from a second read head;
buffering the first set of digital samples as a buffered data set;
selecting one of the buffered data set or the first set of digital samples as a processing output; and
applying a joint equalization algorithm using a joint equalizer circuit to a combination of the processing output and a second set of digital samples derived from a second read head to yield an equalized output.

14. The method of claim 13, wherein the method further comprises:
providing a storage medium having at least a first track located at a radius from a center of the storage medium, wherein the first read head is disposed at least partially over the first track, and wherein selection between the buffered data set and the first set of digital samples is based at least in part on the radius.

15. The method of claim 14, wherein when the radius indicates a location near the center of the storage medium the buffered data set is selected as the processing output, and wherein when the radius indicates a location near an outer edge of the storage medium the first set of digital samples is selected as the processing output.

16. The method of claim 14, wherein the buffer circuit is large enough to store data from one full track near the center of the storage medium, and is not large enough to store data from one full track near an outer edge of the storage medium.

17. The method of claim 13, wherein the method further comprises:
providing a storage medium having at least a first track and a second track, wherein when the first read head is disposed over the first track and the second read head is disposed over the second track, the processing output is selected as the buffered data set.

18. The method of claim 13, wherein the joint equalizer circuit is a first joint equalizer circuit having a target corresponding to the second set of digital samples, the method further comprising:
applying the joint equalization algorithm using a second joint equalizer circuit to the combination of the processing output and the second set of digital samples to yield a second equalized output, wherein the second joint equalizer circuit has a target corresponding to the first set of digital samples.

19. The method of claim 18, wherein the method further comprises:
providing a storage medium having at least a first track located at a radius from a center of the storage medium and a second track, and wherein selection between the buffered data set and the first set of digital samples is based at least in part on the radius.

20. The method of claim 19, wherein the method further comprises:
disabling the second joint equalizer circuit based at least in part on the radius.

* * * * *